United States Patent [19]
Ollivon et al.

[11] Patent Number: 4,934,141
[45] Date of Patent: Jun. 19, 1990

[54] DEVICE FOR MICROWAVE ELIMINATION OF CARBON PARTICLES CONTAINED IN EXHAUST GASES OF HEAT ENGINES

[75] Inventors: Michel Ollivon, Fontenay-sous-Bois; Gérard Renevot, Paris; André-Jean Berteaud, Draveil, all of France

[73] Assignee: Regie Nationale des Usines Renault, Boulogne-Billancourt, France

[21] Appl. No.: 305,651

[22] Filed: Feb. 3, 1989

[30] Foreign Application Priority Data

Feb. 5, 1988 [FR] France ................. 88 01341

[51] Int. Cl.$^5$ .............................................. F01N 3/02
[52] U.S. Cl. ........................................ 60/275; 60/297; 60/303
[58] Field of Search .................. 60/275, 303, 297

[56] References Cited

U.S. PATENT DOCUMENTS 4,825,651  5/1989  Puschner ..................... 60/275

FOREIGN PATENT DOCUMENTS 221805  5/1987  European Pat. Off. .......... 60/275
 58114  4/1984  Japan ........................ 60/275
126022  7/1984  Japan ........................ 60/275
 11416  1/1986  Japan ........................ 60/303

Primary Examiner—Douglas Hart
Attorney, Agent, or Firm—Oblon, Spivak, McClelland, Maier & Neustadt

[57] ABSTRACT

Device for microwave elimination of particles contained in the exhaust gases of diesel engines in which a microwave (λ) source (6) and a conductor (5) of the electromagnetic field generated by the source is joined with a resonator (2 or 3) mounted on an element of the pipe (12) for the exhaust gases which contains an insert, characterized by the fact that the insert consists of a filter (13) whose upstream and downstream ends are offset toward the inside of the cavity defined by the resonator and delimit two chambers (14, 15) in which conductors (4) of the electromagnetic field come out, respectively.

7 Claims, 2 Drawing Sheets

COUPE AB

DEVICE FOR MICROWAVE ELIMINATION OF CARBON PARTICLES CONTAINED IN EXHAUST GASES OF HEAT ENGINES

BACKGROUND OF THE INVENTION

1. Field of the Invention

The invention relates to a device for microwave elimination of carbon particles contained in the exhaust gases of heat engines.

The invention relates more particularly to a device for eliminating carbon particles contained in the exhaust gases of a diesel engine in which a microwave source and a conductor of the electromagnetic field generated by the source are joined with a resonator mounted on an element of the pipe for the exhaust gases containing an insert such as a particle filter.

Publication FR-A 2,588,610 proposed two solutions to obtain the combustion of the carbon particles either by making them go through, or stay in, the zones of the resonator where the electromagnetic field is maximum.

This invention relates to the use of a mode of excitation of a cylindrical cavity constituting the resonator suited to the use of ceramic particle filters available in the industry.

SUMMARY OF THE INVENTION

The invention has as its object a device for elimination of carbon particles and for microwave cleaning of a filter placed in a cylindrical resonator tuned and excited in 0lp TM mode generating a transverse electromagnetic field suited to the material that makes up the filter while a portion of the flow of exhaust gases passes through the filter and brings the oxygen necessary for the combustion of the carbon particles retained in this filter.

A second object of the invention is a system for using the process for cleaning the filter at the temperature of the exhaust gases through a controlled inversion of the direction of circulation of a portion of these gases which pass through this filter to assure the combustion of the carbon deposited on the front face to the filter and improve the rate of elimination of the particles in relation to the prior art which uses a unidirectional current through the filter of the exhaust gases.

A third object of the invention is the use of a resonator that contains a filter whose diameter is considerbly less than the inside diameter of the resonator and whose upstream and downstream ends are offset toward the inside of the resonant cavity over a predetermined distance. This arrangement promotes the combustion of the particles stopped at the periphery of the filter and makes possible the optimal use of the filter without modification of its structure.

In this way, the upstream and downstream ends of the filter delimit, with the resonator, two chambers in which two influxes of the electromagnetic field come out, respectively.

In the device thus made, it is possible to charge more fully the cavity of the resonator and to excite it with a transverse electromagnetic field in 0lp TM mode in which 0, 1 and p are respectively the modes of vibration of the electromagnetic field in a system of cylindrical coordinates where p is a whole number of vibrations of the field along the longitudinal axis of the resonator while 0 and 1 are the modes of vibrations in the radial direction defined by angle 0 in relation to said longitudinal axis.

According to an example of an embodiment of the device, the electromagnetic field is transmitted into the resonant cavity by antennas emitting in a transverse direction perpendicular to the wall of the cavity.

BRIEF DESCRIPTION OF THE DRAWINGS

Other characteristics and advantages of the device will appear in the description of an embodiment of the device made with reference to the accompanying drawing in which.

DESCRIPTION OF THE PREFERRED EMBODIMENT

Figure 1:
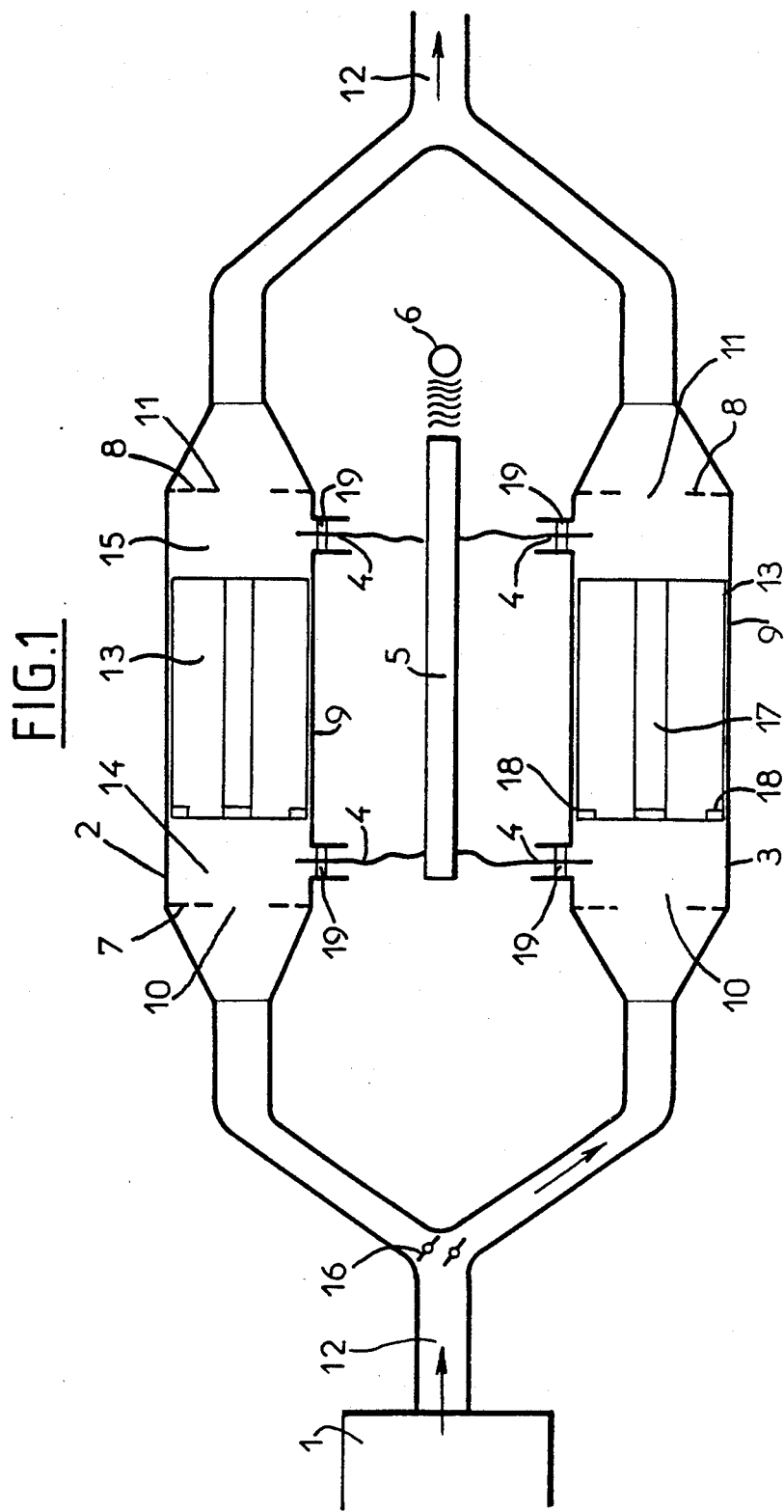
FIG. 1 is an example of an embodiment of the device using two filters in a regeneration system.

Referring to FIG. 1, an engine 1 is seen whose exhaust duct feeds a microwave elimination device as described in publication FR-A 2,588,610 filed in the name of the applicant. Associated with engine 1 is a system with two resonant cavities 2, 3 placed in parallel in which, by means of antennas 4 or iris-coupling orifices, microwaves of wavelength λ conveyed by a hollow conductor 5 of the electromagnetic field come out from a microwave source 6. Resonant cavities 2, 3 comprise respectively perforated front walls 7, 8, separated axially by a predetermined distance and a cylindrical or elliptical peripheral wall 9. Front walls 7, 8 possess respectively a main intake orifice 10 and exhaust orifice 11 for the exhaust gases of engine 1 that are placed concentrically to the center of walls 7, 8 and whose predetermined diameters assure the concentration of the waves between the walls. In each of the cavities 2, 3 is placed a filtering insert 13 thermally insulated on its periphery, whose diameter here is approximately equal to that of the cavity and whose upstream and downstream ends, defined conventionally according to the direction of circulation of the gases, are offset toward the inside of the cavity and delimit two chambers 14, 15 in which there come out, through a dielectric material 19, antennas 4 or irises which make possible the injection of the microwaves generated by source 6 through circular or rectangular openings.

Figure 2:
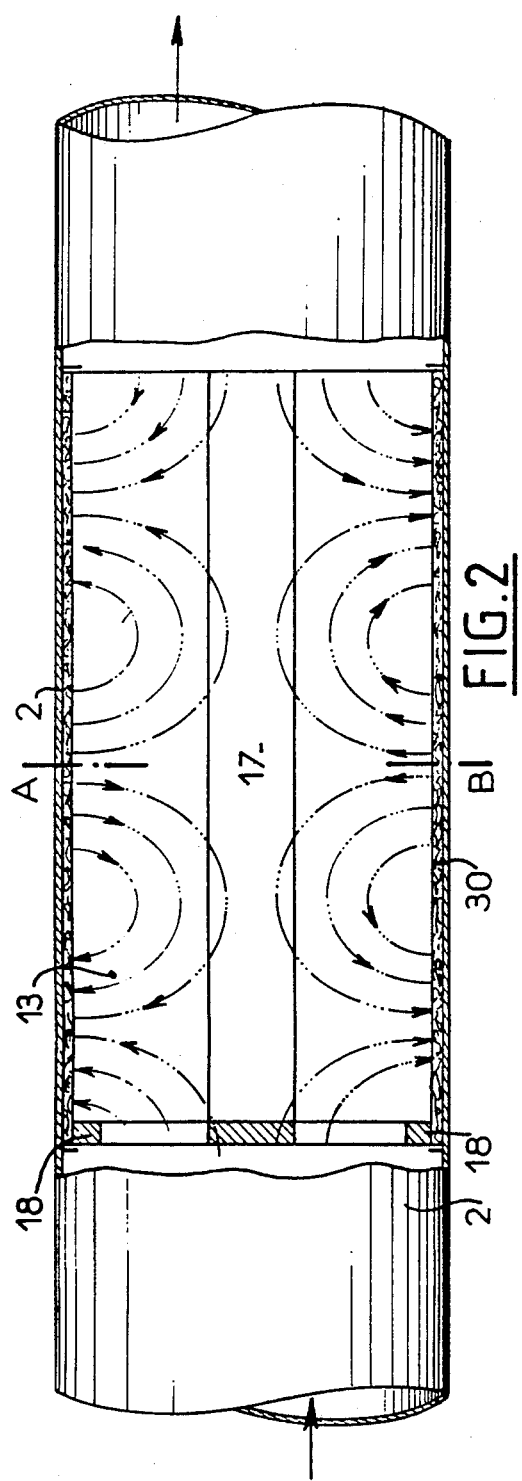
FIG. 2 is a view in axial section of the resonant cavity with a filter which shows the distribution of the lines of force of the electromagnetic field in excitation mode TM 0, 1, 3.
Figure 3:
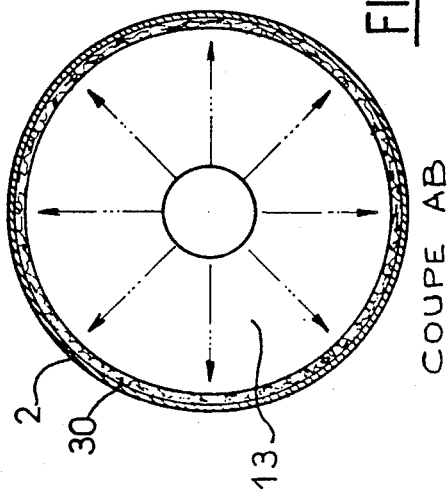
FIG. 3 is a view in radial section of the resonant cavity which shows the radial distribution of the electromagnetic field.

By exciting cavity 2 or 3 in 0lp TM mode in which p=3 according to FIGS. 2 and 3, it is seen that the distribution of the lines of force of the electric field are such that their concentration is maximal.

By way of examples, a filter will be used with a base of mullite fibers or any other material having slight or zero dielectric losses and whose refractory properties make possible the direct combustion of the carbon particles without a prior heating of the filter, i.e. with minimum expenditure of energy.

Depending on the diameter of the filter used, it possesses a longitudinal central recess 17 sealed on the upstream face to eliminate the concentration of microwaves at the core of the filter and along its axis and to reduce its temperature and the danger of destruction as a result of excessive heating. Filtering insert 13, moreover, is thermally insulated from the resonant cavity by insertion of a material 30.

To eliminate deposits of particles on the periphery of the filter in a zone difficult to clean as a result of an insufficient concentration of microwaves, a mask is used with an end in the shape of a circular crown 18 which delimits, in the filter, an annular outside zone in which the particles cannot become attached. Consequently, in this way there is obtained:

a better distribution of microwaves in the useful volume of the filter, an increase in the amount of particles burned and a better efficiency of the combustion.

A controlled switching valve 16 directs the main flow of the exhaust gases to the filter in operation whose resonator is connected downstream to pipe 12.

This constructive arrangement is not limiting because the exhaust gases can be temporarily diverted through a bypass pipe without filter by proceeding to the cleaning of a single main filter as previously described.

It will be noted that the flow of exhaust gases or of air passing through the filter during cleaning must be sufficient to maintain the combustion of the particles but limited to prevent evacuating too quickly the calories produced which participate in the maintenance of this combustion.

This flow can be unidirectional but it is observed that modifying the direction of circulation of the gases in the filter during cleaning make it possible to increase the efficiency of the combustion.

Actually, in a first step, the downstream→upstream direction of circulation promotes, in the filter, the creation of a combustion zone which goes out from the center toward the front face of the filter, which can be cleaned during the combustion.

The upstream→downstream direction of circulation promotes the creation of another equivalent combustion zone which extends from the center toward the rear face of the filter.

A control microprocessor, not shown, will assure control of the entire cleaning process of the filter.

When the filter has approximately the same outside diameter as the resonant cavity, its useful diameter will be reduced by the masking of the peripheral and central zone as represented in FIG. 2.

Figure 4:
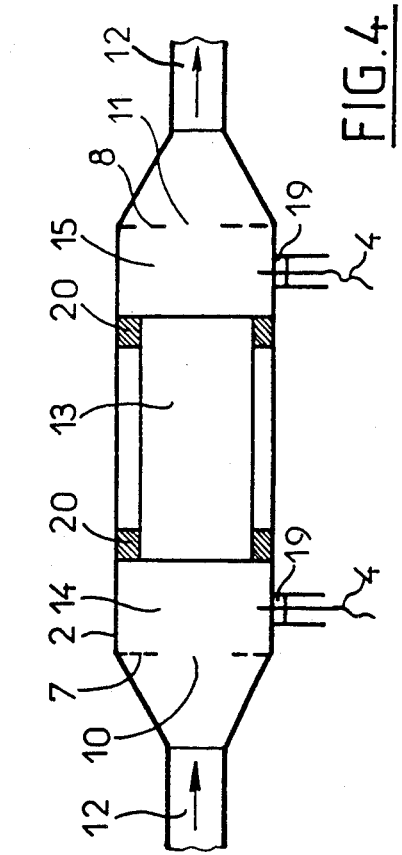
FIG. 4 is a view in axial section of a variant embodiment of the filter placed in the resonant cavity.

FIG. 4 describes a filter whose structure is not modified and which can be current filter on the market. In this case, the inside diameter of the cavity of the resonator is considerably larger than the outside diameter of the filter.

Filter 13 is positioned axially and radially by rings 20 of dielectric material or by any other device which makes it possible to delimit, around the filter, an annular space in which the field of the microwaves is relatively slight and does not participate in the combustion. Rings 20 in this way fulfill the function of annular crown 18.

What is claimed:

1. Device for microwave elimination of particles contained in exhaust gases of Diesel engines in which a microwave source and a conductor of an electromagnetic field generated by said source are joined with at least one resonator, said at least one resonator defining a cavity having an insert therein, said resonator being mounted on an element of an exhaust pipe for the exhaust gases, wherein said insert comprises a filter whose upstream and downstream ends are offset toward the inside of the cavity defined by said at least one resonator and defines two chambers into which conductors of the electromagnetic field extend, respectively, said microwave source and each of said conductors generating a transverse electromagnetic field, wherein said electromagnetic field is uniform throughout said resonator cavity.

2. Device according to claim 1, wherein the resonator delimits a cylindrical cavity excited in 01p TM mode.

3. Device according to claim 1 or 2, wherein the electromagnetic field is introduced in the resonator by emitting antennas.

4. Device according to claim 1, wherein the filter has a base of refractory materials with slight dielectric losses.

5. Device according to claim 4, wherein the filter has a longitudinal central recess closed at one end, said filter further comprising an end mask in the form of a circular crown which delimits in the filter an annular outside zone in which the particles cannot become attached.

6. Device according to claim 1, wherein at least two resonators are placed in parallel in the pipe of the exhaust gases and a switching valve directs the flow to a filter whose resonator is connected to said exhaust pipe or to another filter to always have a filter in the phase of microwave elimination of particles under slight flow of exhaust gases of the engine.

7. Device according to claims 1 or 4, wherein the diameter of the filter is considerably less that the inside diameter of the resonator and said filter is held in the resonator by ring means.

* * * * *